(12) United States Patent
Tagore-Brage

(10) Patent No.: US 7,023,797 B2
(45) Date of Patent: Apr. 4, 2006

(54) FLEXIBLE AGGREGATION OF OUTPUT LINKS

(75) Inventor: Jens P. Tagore-Brage, Frederiksberg (DK)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 09/966,498

(22) Filed: Sep. 27, 2001

(65) Prior Publication Data

US 2002/0131437 A1 Sep. 19, 2002

Related U.S. Application Data

(60) Provisional application No. 60/304,170, filed on Dec. 30, 2000.

(51) Int. Cl.
*H04L 12/26* (2006.01)
*H04L 12/56* (2006.01)

(52) U.S. Cl. .................. 370/230; 370/235; 370/390; 370/401

(58) Field of Classification Search .......... 370/230, 370/235, 389, 390, 400, 401; 709/104, 105, 709/229, 238
See application file for complete search history.

(56) References Cited

U.S. PATENT DOCUMENTS

| | | | |
|---|---|---|---|
| 5,535,195 A | | 7/1996 | Lee |
| 5,949,788 A | | 9/1999 | Friedman et al. |
| 5,959,968 A | | 9/1999 | Chin et al. |
| 6,385,201 B1 | * | 5/2002 | Iwata .................. 370/400 |
| 6,512,742 B1 | * | 1/2003 | Alexander et al. .......... 370/231 |
| 6,667,975 B1 | * | 12/2003 | DeJager et al. .......... 370/389 |
| 6,807,178 B1 | * | 10/2004 | Lemieux .................. 370/395.2 |

OTHER PUBLICATIONS

"Link Aggregation Technology for Increased Bandwidth and Resiliency", Technical Brief, 3Com Corporation, 1999, 4 pages.
"Network Design Guidelines", White Paper, Extreme Networks, 18 pages.
"Server Load Balancing", Technical Brief, Extreme Networks, 6 pages.
McLean, Michelle Rae "Port Aggregation Boosts Throughput", http://lantimes.com/97/97jul/707b043c.html, printed May 17, 2000, 2 pages.
"Duralink Port Aggregation Software", Product Highlights, http://www.adaptec.com/products/overview/portaggregation.html, printed May 17, 2000, 1 page.
"3Com Link Aggregation and Support for IEEE 802.3ad", Technical Paper, 3Com Corporation, 1998, 8 pages.
"Leveraging Redundancy to Build Fault–Tolerant Networks", Technical Brief, Extreme Networks, 2000, 9 pages.
"Solving Server Bottlenecks with Intel Server Adapters", White Paper, Intel Corporation, 1999, 8 pages.

* cited by examiner

*Primary Examiner*—Ricky Ngo
*Assistant Examiner*—Soon D. Hyun
(74) *Attorney, Agent, or Firm*—Blakely, Sokoloff, Taylor & Zafman LLP

(57) ABSTRACT

Methods and apparatuses to calculate an output mask in a network switching engine that can support multiple aggregation methods. An aggregation table is programmed that includes physical link selection information for two or more aggregation methods that are associated with two or more different link aggregation groups.

21 Claims, 5 Drawing Sheets

| LINK AGG. CODE | LINK AGGREGATION GROUP #1 | | | | LINK AGGREGATION GROUP #2 | | | | | | | |
|---|---|---|---|---|---|---|---|---|---|---|---|---|
| | a | b | c | d | a | b | c | d | e | f | g | h |
| AGGREGATION METHOD #1 | | | | | | | | | | | | |
| 0 | 0 | 0 | 0 | 1 | 1 | 1 | 1 | 1 | 1 | 1 | 1 | 1 |
| 1 | 0 | 0 | 1 | 0 | 1 | 1 | 1 | 1 | 1 | 1 | 1 | 1 |
| 2 | 0 | 1 | 0 | 0 | 1 | 1 | 1 | 1 | 1 | 1 | 1 | 1 |
| 3 | 1 | 0 | 0 | 0 | 1 | 1 | 1 | 1 | 1 | 1 | 1 | 1 |
| AGGREGATION METHOD #2 | | | | | | | | | | | | |
| 0 | 1 | 1 | 1 | 1 | 0 | 0 | 0 | 0 | 0 | 0 | 0 | 1 |
| 1 | 1 | 1 | 1 | 1 | 0 | 0 | 0 | 0 | 0 | 0 | 1 | 0 |
| 2 | 1 | 1 | 1 | 1 | 0 | 0 | 0 | 0 | 0 | 1 | 0 | 0 |
| 3 | 1 | 1 | 1 | 1 | 0 | 0 | 0 | 0 | 1 | 0 | 0 | 0 |
| 4 | 1 | 1 | 1 | 1 | 0 | 0 | 0 | 1 | 0 | 0 | 0 | 0 |
| 5 | 1 | 1 | 1 | 1 | 0 | 0 | 1 | 0 | 0 | 0 | 0 | 0 |
| 6 | 1 | 1 | 1 | 1 | 0 | 1 | 0 | 0 | 0 | 0 | 0 | 0 |
| 7 | 1 | 1 | 1 | 1 | 1 | 0 | 0 | 0 | 0 | 0 | 0 | 0 |

FIG. 4

FLEXIBLE AGGREGATION OF OUTPUT LINKS

RELATED APPLICATIONS

This application claims the benefit of U.S. provisional patent application No. 60/304,170, filed Dec. 30, 2000.

FIELD OF THE INVENTION

The present invention relates generally to networks and network devices and, in particular, to output link aggregation in a port mask-based network switching engine.

BACKGROUND

A network switch of a data communications network provides a "switching" function for transferring information, such as data frames, among entities of the network. Typically, the switch is a computer that includes a collection of components (e.g., cards) interconnected by a backplane of wires. Each card may include a limited number of ports that couple the switch to the other network entities over various types of media, such as Ethernet, FDDI, or token ring connections. A network entity may consist of any device that "sources" (i.e., transmits) or "sinks" (i.e., receives) data frames over such media.

The switching function provided by the switch typically involves receiving data at a source port from a network entity, transferring the data over the backplane to a destination port and, thereafter, transmitting that data over a medium to another entity of the network. In many cases, the destination of a data frame may be more than one, but less than all of the ports of the switch. This type of multicast data transfer is typically employed to segregate communication between groups of entities on a network. However, multicast transfers generally degrade the performance of a switch because of the additional bandwidth consumed by the multiple output copies and because of the software involvement typically needed to effect forwarding decisions for the frame based on port membership in a group. Performance degradation may be further exasperated in a situation where it is desired to connect a single network entity to two different ports (i.e., "dual-homed" connection) with the purpose of increasing available bandwidth.

When the forwarding part of a switch engine receives a frame, it must determine to which of several output ports to send the frame. When link aggregation is employed, the forwarder should attempt to distribute the load evenly over each set of aggregated output links (the set composing a single "logical" port). For each aggregate group selected for forwarding, a frame should be output to one and only one link. In a port mask-based switch, this is done by combining two port masks: a Forwarding Mask, which indicates which aggregate group(s) to output the frame to, and an Aggregation Mask, which indicates which port in each aggregate to use.

In one current method of distributing data frames in a port mask-based switching engine, an aggregation code (such as a numerical value) is derived based on the data frame that is to be forwarded. The aggregation code is then used as an index to an aggregation table. The aggregation table provides a port to which the frame is to be sent on each aggregated link for each aggregation code.

The aggregation code can be derived from information in the frame according to one of many possible schemes or algorithms, some of which are known as "Legacy" methods. Legacy methods typically use Source Media Access Control (Source MAC or SMAC) based aggregation schemes. For example, the aggregation code can be derived from the lower two bits of the Source MAC address or from a selected number of bits from the Source MAC address and a selected number of bits from the Destination MAC (DMAC) address after a Boolean operation such as exclusive OR (XOR) is performed on the selected SMAC and DMAC bits.

More advanced or modern methods of deriving an aggregation code often use more complex schemes based on other fields extracted from the frame such as the source IP (SIP) address. For example, an XOR operation can be performed on selected bits (such as the lower two bits) of the SIP address and selected bits (such as the lower two bits) of the Source MAC address to derive the aggregation code that is then used as an index to the aggregation table to "look up" the proper port for a particular aggregated group.

In modern networks, a switch may need to communicate with other switches and other network entities that may not be as advanced in that they may not support the more advanced methods of deriving an aggregation code. For instance, as network components are upgraded or as more devices are added to a network, some of the devices may only support Legacy methods. The more modern aggregation methods are incompatible with the Legacy methods.

In networks that have both Legacy switches and more advanced switches, it may be possible to use Legacy methods for link aggregation on all switches. The probability of even distribution of network traffic on the switches, however, is decreased.

In such networks, if both modern and Legacy aggregation methods worked in parallel, all frames could be forwarded to all destination devices, and depending on the destination, a proper aggregation method could be chosen.

BRIEF DESCRIPTION OF THE DRAWINGS

The invention is illustrated by way of example, and not limitation, in the figures of the accompanying drawings in which:

FIG. 4 is an embodiment of an aggregation table of the present invention;

DETAILED DESCRIPTION

Figure 1:
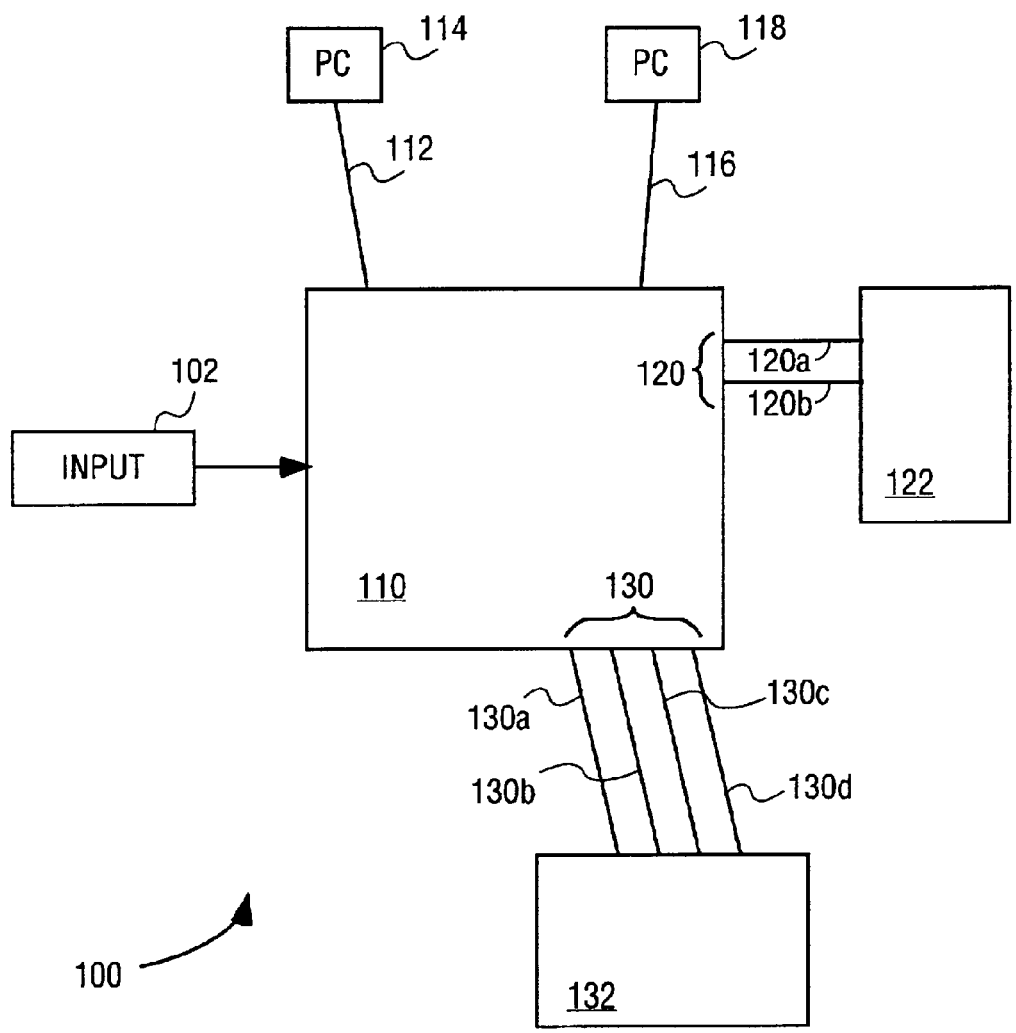
FIG. 1 is a schematic illustration of a network embodying the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description which follows are presented in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable or accessible storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices, electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 shows an example of a network 100 or a portion of a network on which embodiments of the present invention can be used. Network device 110 can be coupled to many different types of other network devices. Network device 110 is a type of network device that includes means for forwarding an input 102 to one or more other network devices. In one embodiment, network device 110 is a switch.

In FIG. 1, the exemplary network device 110 is coupled to a PC 114 or other type of end user station, another PC 118, a network device 122, and another network device 132. Physical links 112 and 116 couple network device 110 to network devices 114 and 118, respectively. Network device 110 is coupled to network device 122 by a link aggregation group 120 and to network device 132 by a link aggregation group 130.

Link aggregation group 120 includes two physical links 120a and 120b, in the exemplary network shown in FIG. 1. Similarly, link aggregation group 130 includes four physical links 130a, 130b, 130c, and 130d.

Network device 110 includes a mechanism or means for forwarding an input which can include a mechanism or means for determining to which output to send the input. For example, link aggregation groups 120 and 130 each include multiple physical links. Typically, multiple physical links are provided to increase the bandwidth or the capacity of the link between two network devices. In order to efficiently use link aggregation groups, a switch should include a method to determine which physical link to use for forwarding an input. For instance, as inputs are forwarded through the system, they should be distributed among the multiple physical links in order to most efficiently utilize the bandwidth. It should be noted that while an input can be referred to herein as a frame, packet, or datagram, it is the data presented on the input that is forwarded amongst the network devices.

Figure 2:
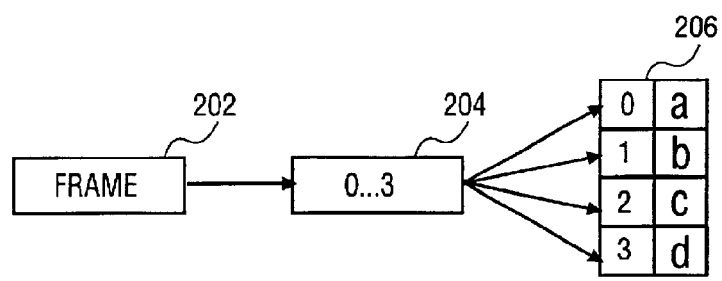
FIG. 2 is a schematic of an embodiment of a physical link selection method.

FIG. 2 shows one example of a method to determine the output port or physical link to which the input is to be sent. Typically, an input such as a frame 202 includes information from which a number can be derived. Examples of such information can be the lower two bits of the source MAC address, the destination MAC address or other such strings of information.

In the example of FIG. 2, frame 202 can generate the numbers 0 through 3 as shown in block 204. In this example, four numbers are generated because two bits are used. The numbers correspond to physical links, represented in FIG. 2 as letters a through d. Thus, based on information derived from the input, a physical link can be chosen to be the one over which the information of the input is sent.

Figure 3:
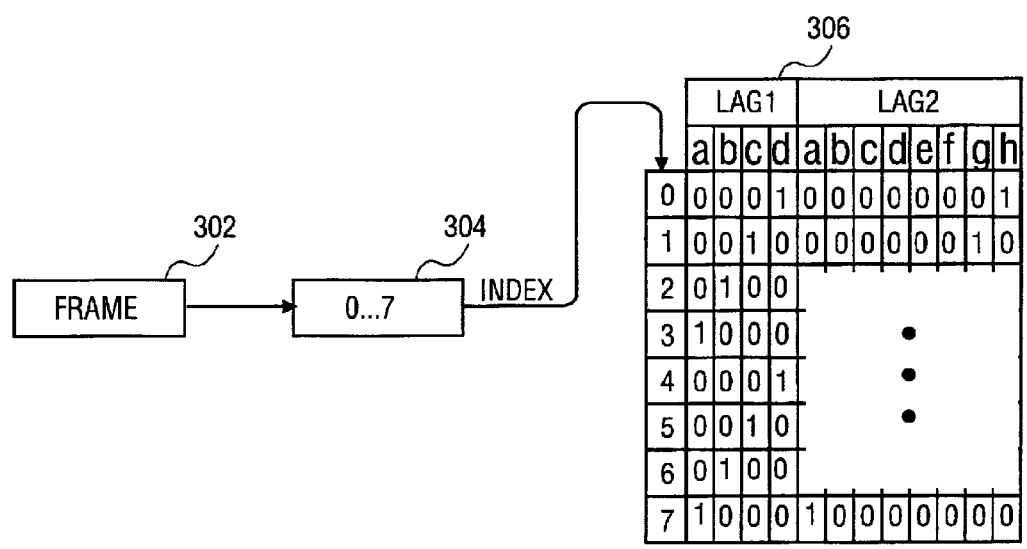
FIG. 3 is a schematic of an embodiment of a physical link selection method.

FIG. 3 shows another example of a method to determine the output port or physical link to which and input is to be sent. In FIG. 3, an input 302 includes information from which a number can be derived. In the example of FIG. 3, block 304 represents the generated numbers 0 through 7. In this example, eight numbers are generated because three bits are used.

The numbers are then used as an index to a table 306 which includes information to determine to which physical link of a link aggregation group the input 302 should be sent. Each number 0 through 7 corresponds to a row of entries that are set to either true or false (represented by ones and zeros in FIG. 3). The columns of table 306 correspond to physical links that are represented by letters a through d for a first link aggregation group (LAG 1) and by letters a through h for a second link aggregation group (LAG 2). For each number 0 through 7 only one physical link corresponding to each link aggregation group has an entry set to true. Thus, multiple packets or frames can be distributed over a number of link aggregation groups associated with the particular switch. Another operation typically associated with a network switch can determine which of the multiple link aggregation groups are to receive the input.

The methods of determining the physical link to which to send the input shown in FIGS. 2 and 3 are limited, however, to network devices that support only one aggregation method. Typically, these devices used a source MAC based aggregation method to select a row of the table to choose the physical link to which to send a frame. Switches on more modern networks, however, can be coupled with many other devices that use aggregation methods based on more advanced protocols or methods. For example, more and advanced aggregation methods can use information derived from the source IP address. Also, more advanced methods can support complex operations such as performing a Boolean operation on selected bits of the source IP address and another field such as the source MAC address or the destination MAC address, for example.

Embodiments of the present invention provide methods and apparatuses to calculate an output mask in a network switching engine that can support multiple aggregation methods. An aggregation table is programmed that includes physical link selection information for two or more aggregation methods that are associated with two or more different link aggregation groups.

FIG. 4 shows an embodiment of an aggregation table. The exemplary table of FIG. 4 shows two sets of rows associated with two aggregation methods and two sets of columns associated with two link aggregation groups (LAG). It should be noted that additional rows and columns can be added for other embodiments of the present invention. The table of FIG. 4 is shown for its relative simplicity of description.

The table of FIG. 4 is programmed to define a plurality of entries. Each entry is associated with a column and a row. An entry in the table is set to true (represented as 1 in FIG. 4) according to the following rules:

the column of the entry corresponds to a physical link (represented by lower case letters a through h) of a link aggregation group (LAG) that uses an aggregation method associated with the row of the entry and which is the physical link to be selected within its LAG according to the aggregation method; or the column of the entry corresponds to a physical link associated with a LAG that does not use the aggregation method associated with the row of the entry.

All remaining entries are set to false (represented by 0 in FIG. 4).

The method of the invention can also include receiving a frame at a switch engine that supports a set of aggregation methods. The header information of the frame may be used to derive an aggregation code for each aggregation method supported by the switch engine. The aggregation code calculation for a given aggregation method may depend on the frame format. Next, the method preferably includes calculating a set of aggregation codes for the frame. Rows in the table are selected according to each of the aggregation codes according to a corresponding aggregation method. The set of two or more rows reflects the set of aggregation methods supported by the switch engine.

Referring again to FIG. 1, the network device 110 may need to support two or more aggregation methods according to the devices to which it may need to output information. For example, device 122 may only support an older or "legacy" aggregation method, while device 132 may use more modern aggregation methods.

Referring again to FIG. 4, when two or more aggregation methods are used, two or more rows in the aggregation table are chosen. The number of rows chosen corresponds to the number of aggregation methods. Each aggregation method will generate an aggregation code and thus, a separate row in the table will be chosen according to a separate aggregation method.

Preferably, the method of the present invention further includes performing a Boolean AND operation on the table entries of the two or more selected rows to calculate an aggregation mask. For example, if a data frame provides information from which, using the aggregation method #1, the aggregation code 1 is derived, and the same data frame provides information from which, using the aggregation method #2, the aggregation code 3 is derived, the following rows are selected from the table, the AND operation is performed on the entries of the rows, and the aggregation mask is calculated as shown below.

| Agg. Meth. #1 (Agg. code 1) | 0 | 0 | 1 | 0 | 1 | 1 | 1 | 1 | 1 | 1 | 1 | 1 |
|---|---|---|---|---|---|---|---|---|---|---|---|---|
| Agg. Meth. #2 (Agg. code 3) | 1 | 1 | 1 | 1 | 0 | 0 | 0 | 0 | 1 | 0 | 0 | 0 |
| Agg. Mask | 0 | 0 | 1 | 0 | 0 | 0 | 0 | 0 | 1 | 0 | 0 | 0 |

Next, the aggregation mask calculated above can taken together with a forwarding mask of the switch and a Boolean AND operation can be performed on the aggregation mask and the forwarding mask to calculate an output mask. An example of a forwarding mask and the above aggregation mask and an output mask calculated therefrom are shown below.

| Agg. Mask | 0 | 0 | 1 | 0 | 0 | 0 | 0 | 0 | 1 | 0 | 0 | 0 |
|---|---|---|---|---|---|---|---|---|---|---|---|---|
| Forwarding mask | 0 | 0 | 0 | 0 | 1 | 1 | 1 | 1 | 1 | 1 | 1 | 1 |
| Output Mask | 0 | 0 | 0 | 0 | 0 | 0 | 0 | 0 | 1 | 0 | 0 | 0 |

Thus, in the example above, the frame will be forwarded only to physical link e of the link aggregation group #2.

Figure 5:
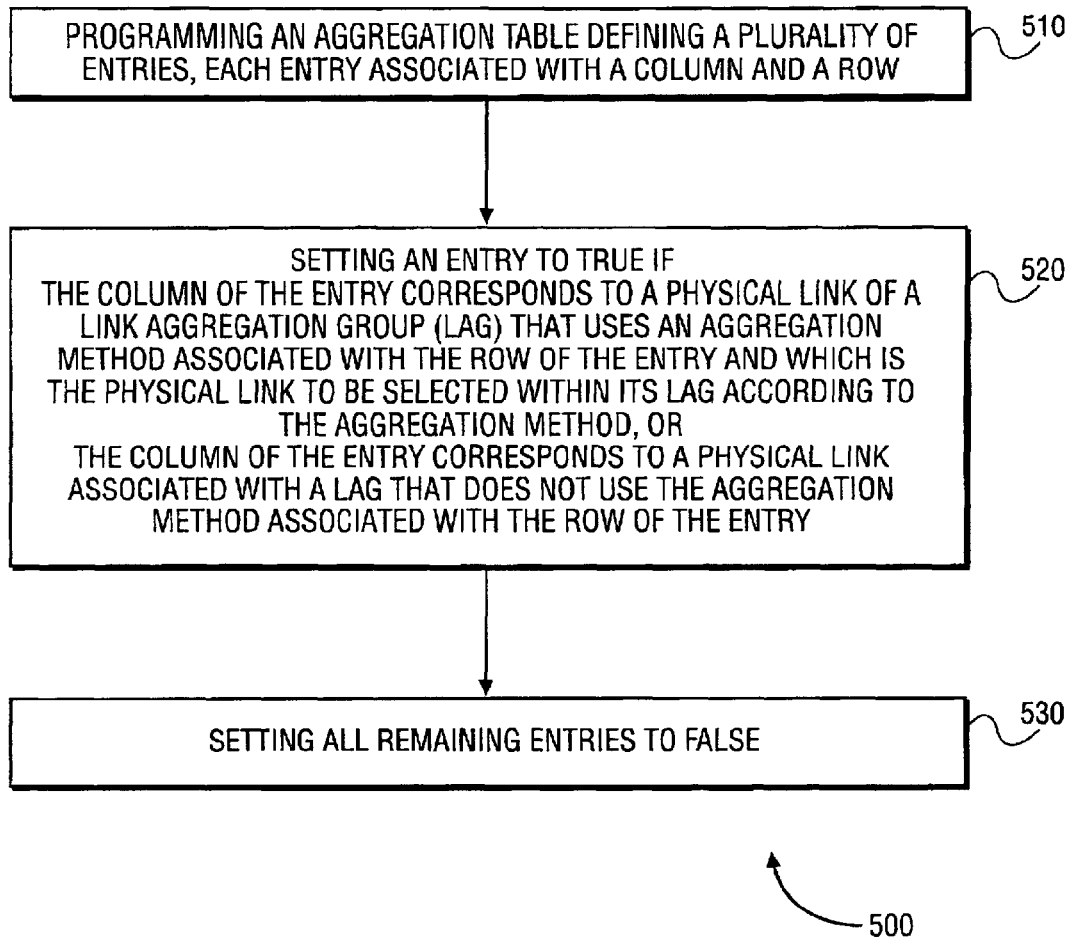
FIG. 5 is a flowchart showing an embodiment of a method of the present invention.

FIG. 5 shows a flowchart of an exemplary embodiment of a method of the present invention in which the various blocks represent operations or procedures to perform the methods. It should be noted that the operations or procedures represented in the flowchart do not necessarily need to be executed in the order shown. Also, all of the operations or procedures may not be necessary for every embodiment of the present invention.

Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or a produce a result.

Method 500 includes the operations shown in blocks 510 through 530. Block 510 shows the operation of programming an aggregation table defining a plurality of entries, each entry associated with a column and a row. Block 520 shows the operation of setting an entry to true if the column of the entry corresponds to a physical link of a link aggregation group (LAG) that uses an aggregation method associated with the row of the entry and which is the physical link to be selected within its LAG according to the aggregation method, or the column of the entry corresponds to a physical link associated with a LAG that does not use the aggregation method associated with the row of the entry. Block 530 shows the operation of setting all remaining entries to false.

Figure 6:
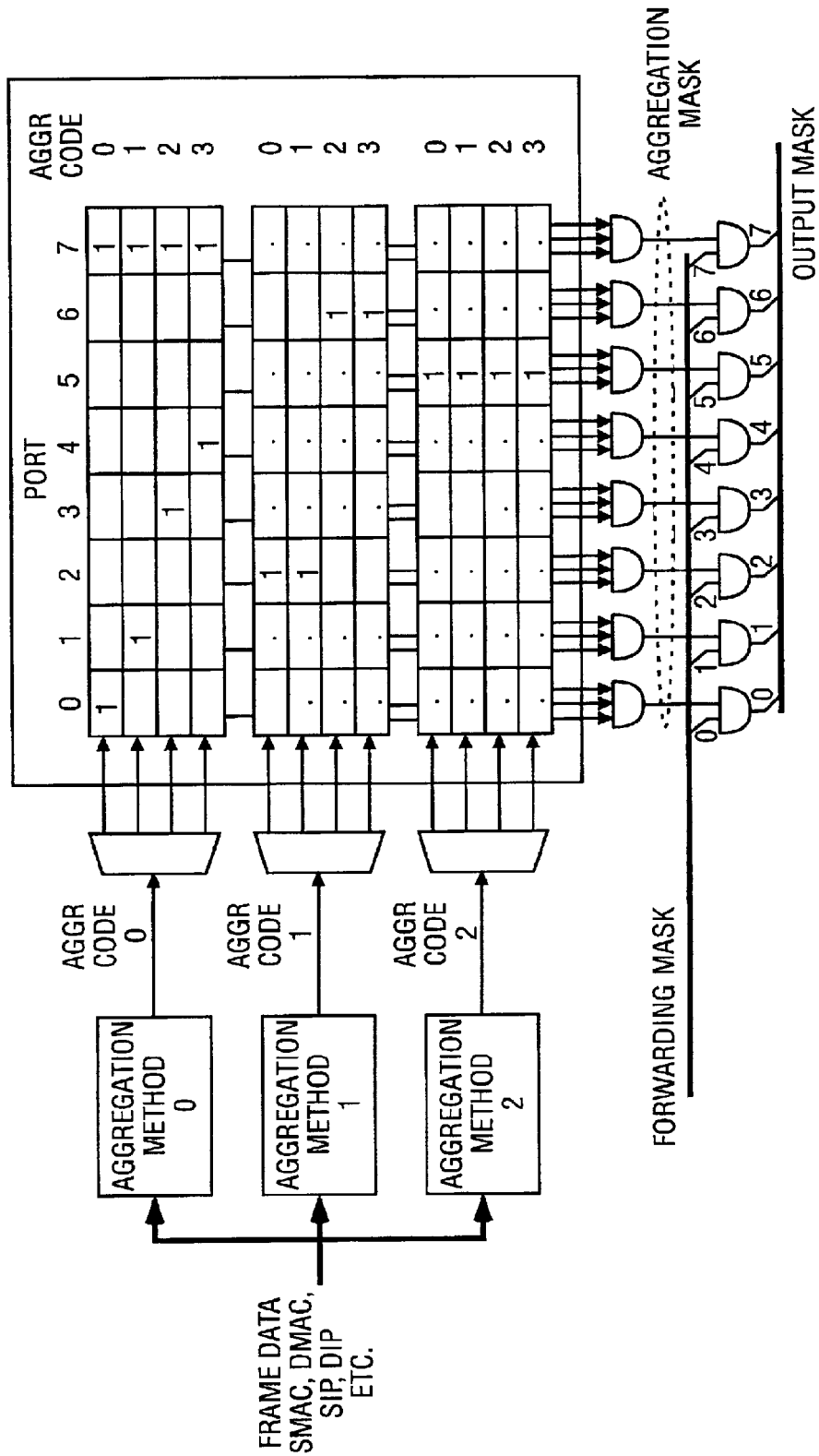
FIG. 6 is a schematic of an embodiment of an implementation of the present invention.

FIG. 6 is a schematic of an exemplary embodiment of a hardware implementation of the present invention. FIG. 6 illustrates a register file-based implementation. Depending on speed requirements, the invention can be implemented with the aggregation table stored in a register file (allowing all $N_m$ port maps to be read at the same time) or in a RAM (requiring $N_m$ sequential read accesses). In the first case, the aggregation mask is generated by $N_p$ AND gates with $N_m$ inputs. In the second case, an iterative implementation based on $N_p$ flipflops and 2-input AND gates should be used. The final port mask (i.e., output mask) is then produced by $N_p$ 2-input AND gates.

The present invention allows multiple simultaneous aggregation protocols to be handled in a port mask based forwarding engine. Presently, forwarding engines are restricted to a single protocol (i.e., aggregation method) at a time (if using a single set of aggregation masks), or are considerably more expensive to implement in silicon or with respect to CPU time (if handling each aggregation group independently). Also, the invention allows arbitrary ports (i.e., physical links) to be grouped for aggregation, while current methods typically limit aggregation to adjacent ports.

The invention is also adaptable to changes in the number of links in each link aggregation group. Thus, "dead links" can be avoided simply by programming a different port in the aggregation table. For every aggregation code within an aggregation group there must be exactly one true entry in the rows belonging to the chosen aggregation method, but the same physical link (port) may well occur in multiple rows.

The invention also allows for flexibility in choosing which physical links or ports to aggregate, thus providing an end customer with a scalable, flexible, and upgradeable product. Networks can be upgraded and compatibility can be maintained with current network devices, while allowing compatibility with more advanced protocols to be introduced in the future.

What is claimed is:

1. A method comprising:
   programming an aggregation table defining a plurality of entries, each entry associated with a column and a row, wherein programming the aggregation table includes
   (a) setting an entry to true if
      the column of the entry corresponds to a physical link of a link aggregation group (LAG) that uses an aggregation method associated with the row of the entry and which is the physical link to be selected within its LAG according to the aggregation method, or
      the column of the entry corresponds to a physical link associated with a LAG that does not use the aggregation method associated with the row of the entry; and
   (b) setting all remaining entries to false.

2. The method of claim 1 further comprising
   receiving a frame at a switch engine that supports a set of aggregation methods; and
   calculating a set of aggregation codes for the frame.

3. The method of claim 2 further comprising selecting a set of two or more rows of the aggregation table, each row being selected according to a corresponding aggregation method, and wherein the set of two or more rows reflects the set of aggregation methods supported by the switch engine.

4. The method of claim 3 further comprising calculating an aggregation mask by performing a Boolean AND operation on the table entries of the two or more selected rows.

5. The method of claim 4 further comprising calculating an output mask by performing a Boolean AND operation on the aggregation mask and a forwarding mask.

6. The method of claim 5 further comprising forwarding the frame to at least one physical link according to the output mask.

7. The method of claim 1 wherein the aggregation table includes at least two sets of rows and at least two sets of columns, each set of rows corresponds to a set of aggregation codes derived exclusively from one of at least two aggregation methods, such that each aggregation method is associated with only one set of rows, each set of columns corresponds to a link aggregation group (LAG), each LAG includes a plurality of physical links, each physical link corresponds to one column, and each LAG uses only one aggregation method.

8. An apparatus comprising:
   means for programming an aggregation table defining a plurality of entries, each entry associated with a column and a row, wherein the means for programming the aggregation table includes
   (a) means for setting an entry to true if:
      the column of the entry corresponds to a physical link of a link aggregation group (LAG) that uses an aggregation method associated with the row of the entry and which is the physical link to be selected within its LAG according to the aggregation method, or
      the column of the entry corresponds to a physical link associated with a LAG that does not use the aggregation method associated with the row of the entry; and
   (b) means for setting all remaining entries to false.

9. The apparatus of claim 8 further comprising
   means for receiving a frame at a switch engine that supports a set of aggregation methods; and
   means for calculating a set of aggregation codes for the frame.

10. The apparatus of claim 9 further comprising means for selecting a set of two or more rows of the aggregation table, each row being selected according to a corresponding aggregation method, and wherein the set of two or more rows reflects the set of aggregation methods supported by the switch engine.

11. The apparatus of claim 10 further comprising means for calculating an aggregation mask, the means for calculating an aggregation mask including means for performing a Boolean AND operation on the table entries of the two or more selected rows.

12. The apparatus of claim 11 further comprising means for calculating an output mask, the means for calculating an output mask including means for performing a Boolean AND operation on the aggregation mask and a forwarding mask.

13. The apparatus of claim 12 further comprising means for forwarding the frame to at least one physical link according to the output mask.

14. The apparatus of claim 8 wherein the aggregation table includes at least two sets of rows and at least two sets of columns, each set of rows corresponds to a set of aggregation codes derived exclusively from one of at least two aggregation methods, such that each aggregation method is associated with only one set of rows, each set of columns corresponds to a link aggregation group (LAG), each LAG includes a plurality of physical links, each physical link corresponds to one column, and each LAG uses only one aggregation method.

15. An apparatus comprising a machine accessible medium containing instructions which, when executed by a machine, cause the machine to perform operations comprising:
 programming an aggregation table defining a plurality of entries, each entry associated with a column and a row, wherein programming the aggregation table includes
  (a) setting an entry to true if
   the column of the entry corresponds to a physical link of a link aggregation group (LAG) that uses an aggregation method associated with the row of the entry and which is the physical link to be selected within its LAG according to the aggregation method, or
   the column of the entry corresponds to a physical link associated with a LAG that does not use the aggregation method associated with the row of the entry; and
  (b) setting all remaining entries to false.

16. The apparatus of claim 15 further comprising
 receiving a frame at a switch engine that supports a set of aggregation methods; and
 calculating a set of aggregation codes for the frame.

17. The apparatus of claim 16 comprising selecting a set of two or more rows of the aggregation table, each row being selected according to a corresponding aggregation method, and wherein the set of two or more rows reflects the set of aggregation methods supported by the switch engine.

18. The apparatus of claim 17 further comprising calculating an aggregation mask by performing a Boolean AND operation on the table entries of the two or more selected rows.

19. The apparatus of claim 18 further comprising calculating an output mask by performing a Boolean AND operation on the aggregation mask and a forwarding mask.

20. The apparatus of claim 19 further comprising forwarding the frame to at least one physical link according to the output mask.

21. The apparatus of claim 15 wherein the aggregation table includes at least two sets of rows and at least two sets of columns, each set of rows corresponds to a set of aggregation codes derived exclusively from one of at least two aggregation methods, such that each aggregation method is associated with only one set of rows, each set of columns corresponds to a link aggregation group (LAG), each LAG includes a plurality of physical links, each physical link corresponds to one column, and each LAG uses only one aggregation method.

* * * * *